US010425202B2

(12) United States Patent
Olsson et al.

(10) Patent No.: US 10,425,202 B2
(45) Date of Patent: Sep. 24, 2019

(54) ROBUST WIRELESS RADIO TRANSMISSION

(71) Applicant: TELEFONAKTIEBOLAGET L M ERICSSON (PUBL), Stockholm (SE)

(72) Inventors: Bengt-Erik Olsson, Hovås (SE); Robert Lindgren, Västra Frölunda (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 113 days.

(21) Appl. No.: 14/780,926

(22) PCT Filed: Sep. 23, 2015

(86) PCT No.: PCT/EP2015/071913
§ 371 (c)(1),
(2) Date: Sep. 28, 2015

(87) PCT Pub. No.: WO2017/050374
PCT Pub. Date: Mar. 30, 2017

(65) Prior Publication Data
US 2017/0141890 A1 May 18, 2017

(51) Int. Cl.
*H04L 5/00* (2006.01)
*H04W 72/08* (2009.01)
(Continued)

(52) U.S. Cl.
CPC ....... *H04L 5/0044* (2013.01); *H04W 72/0446* (2013.01); *H04W 72/0453* (2013.01); *H04W 72/085* (2013.01); *H04W 92/12* (2013.01)

(58) Field of Classification Search
CPC ...... H04W 88/085; H04W 88/08; H04B 3/54; H04B 3/52; H04B 3/56
See application file for complete search history.

(56) References Cited

U.S. PATENT DOCUMENTS 9,020,070 B2 4/2015 Bellot et al.
9,059,970 B1 6/2015 Joung et al.
(Continued)

FOREIGN PATENT DOCUMENTS

EP 2 337 423 A2 6/2011
WO WO 2011/038597 A1 4/2011
(Continued)

OTHER PUBLICATIONS

"Common Public Radio Interface (CPRI); Interface Specification V6.1", CPRI Specification V6.1, Jul. 1, 2014 (Jul. 1, 2014), pp. 1-129, XP55272674, Retrieved from the Internet: URL:http://www.cpri.info/ downloads/CPRI v 6 1 2014-07-01.pdf.
(Continued)

*Primary Examiner* — Jung H Park

(57) ABSTRACT

There is provided mechanisms for robust wireless radio transmission. A method is performed by a network node. The method comprises acquiring data to be transmitted on a wireless radio link. The method comprises separating the data into a radio access technology (RAT) payload part and a management data part. The method comprises acquiring channel condition values for the wireless radio link. The method comprises dynamically allocating resources between the RAT payload part and the management data part according to the channel condition values. The method comprises transmitting the data over the wireless radio link using said allocated resources.

21 Claims, 5 Drawing Sheets

(51) Int. Cl.
H04W 72/04 (2009.01)
H04W 92/12 (2009.01)

(56) References Cited

U.S. PATENT DOCUMENTS

| | | | | |
|---|---|---|---|---|
| 2012/0057572 | A1* | 3/2012 | Evans | H04W 88/085 |
| | | | | 370/338 |
| 2013/0294541 | A1* | 11/2013 | Blanc | H04W 24/00 |
| | | | | 375/295 |
| 2013/0329633 | A1* | 12/2013 | Dalela | H04L 12/4633 |
| | | | | 370/328 |
| 2015/0141032 | A1* | 5/2015 | Aydin | H04W 72/1226 |
| | | | | 455/452.2 |
| 2015/0195740 | A1 | 7/2015 | Shor et al. | |
| 2015/0244618 | A1* | 8/2015 | Chakrabarti | H04L 45/74 |
| | | | | 370/329 |

FOREIGN PATENT DOCUMENTS

| | | |
|---|---|---|
| WO | WO 2015/001389 A1 | 7/2013 |
| WO | 2015124793 A1 | 8/2015 |

OTHER PUBLICATIONS

Chen, et al. Demonstration of Analog Millimeter-wave Fronthaul Link for 64-QAM LTE Signal Transmission. Vehicular Technology Conference (VTC2015-Fall) (2015).

* cited by examiner

ROBUST WIRELESS RADIO TRANSMISSION

TECHNICAL FIELD

Embodiments presented herein relate to robust wireless radio transmission, and particularly to a method, a network node, a computer program, and a computer program product for robust wireless radio transmission.

BACKGROUND

In communications networks, there may be a challenge to obtain good performance and capacity for a given communications protocol, its parameters and the physical environment in which the communications network is deployed.

For example, communications networks may use remote radio units (RRUs) connected to centralized base band processing units, or network nodes, such as evolved NodeBs, that process the transmitted and received radio signals from the RRUs. The communication format often used for transmitting signals between the RRU and the eNodeB is the standardized common public radio interface (CPRI), defined by the CPRI co-operation, that allows digital transmission between RRUs and network nodes, such as evolved NodeBs. CPRI specification version 6.1 is currently available from www.cpri.info. The part of the communication network between the eNodeB and the RRUs are often referred to as fronthaul while the part of the communication network between the eNodeB and the evolved packet core (EPC) part of the communication network is referred to as backhaul.

FIG. 1 provides a schematic illustration of a communications network 100 where a wireless device no connects to one or more RRUs 120 that feed the signal as communicated with the wireless device no to a network node 200 over a fronthaul communication link being a wireless radio link 130. The network node 200 can use one or more RRUs 120 to communicate with the wireless device no and assemble data received from the wireless device 110.

The fronthaul network carries information representing the wireless signal that is communicated between RRUs and the wireless device, therefore the fronthaul part of the communications network must accommodate the full amplitude and phase information of the wireless signal communicated between the wireless device no and the network node 200. The bandwidth of a digitized version of this signal becomes much larger than the bandwidth used between the RRU 120 and the wireless device no for analog wireless transmission.

Hence there is a need for bandwidth efficient wireless fronthaul transport mechanisms.

SUMMARY

An object of embodiments herein is to provide efficient wireless fronthaul transport mechanisms for wireless radio transmission between a network node and a device receiving data from the network node.

According to a first aspect there is presented a method for robust wireless radio transmission. The method is performed by a network node. The method comprises acquiring data to be transmitted on a wireless radio link. The method comprises separating the data into a radio access technology (RAT) payload part and a management data part. The method comprises acquiring channel condition values for the wireless radio link. The method comprises dynamically allocating resources between the RAT payload part and the management data part according to the channel condition values. The method comprises transmitting the data over the wireless radio link using said allocated resources.

Advantageously this provides robust wireless radio transmission between the network node and a device, such as a remote radio unit, receiving the data from the network node over the wireless radio link.

Advantageously this enables the wireless radio link to be made robust to deep fading that can occur during rain or difficult atmospheric conditions. The management traffic needed to keep remote radio units (RRU) and other devices connected over the wireless radio link can thereby be guaranteed at the cost of reduced quality of the RAT payload part transmitted over the wireless radio link.

According to a second aspect there is presented a network node for robust wireless radio transmission. The network node comprises processing circuitry. The processing circuitry is configured to cause the network node to perform a method according to the first aspect.

According to an embodiment the network node further comprises a storage medium storing a set of operations for causing the network node to perform the method according to the first aspect. The processing circuitry is configured to retrieve the set of operations from the storage medium to cause the network node to perform the set of operations.

According to an embodiment the set of operations is provided as a set of executable instructions.

According to a third aspect there is presented a network node for robust wireless radio transmission. The network node comprises processing circuitry. The network node comprises a computer readable storage medium storing instructions that, when executed by the processing circuitry, causes the network node to perform a method according to the first aspect.

According to a fourth aspect there is presented a network node for robust wireless radio transmission. The network node comprises an acquire module configured to acquire data to be transmitted on a wireless radio link. The network node comprises a separate module configured to separate the data into a RAT payload part and a management data part. The acquire module is further configured to acquire channel condition values for the wireless radio link. The network node comprises an allocate module configured to dynamically allocate resources between the RAT payload part and the management data part according to the channel condition values. The network node comprises a transmit module configured to transmit said data over said wireless radio link using said allocated resources.

According to a fifth aspect there is presented a computer program for robust wireless radio transmission, the computer program comprising computer program code which, when run on a network node, causes the network node to perform a method according to the first aspect.

According to a sixth aspect there is presented a computer program product comprising a computer program according to the fifth aspect and a computer readable means on which the computer program is stored.

It is to be noted that any feature of the first, second, third, fourth, fifth, and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
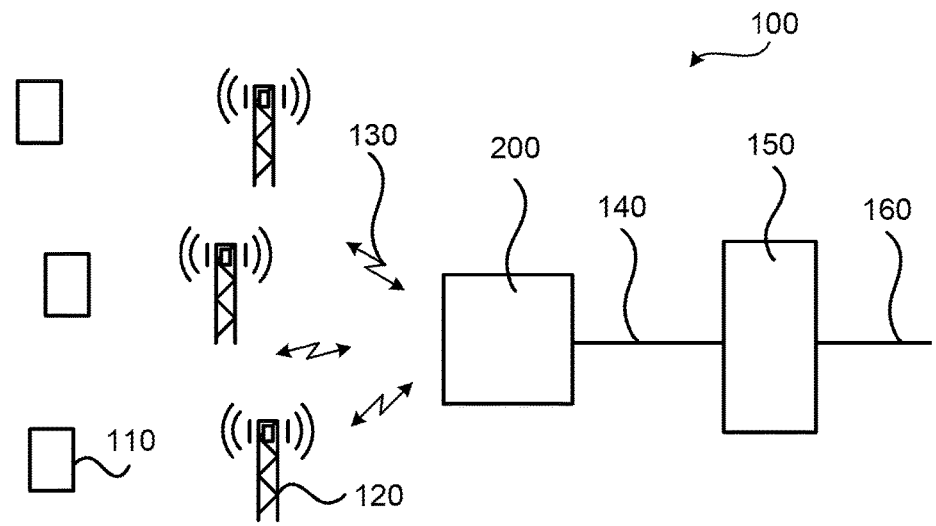
FIG. 1 is a schematic diagram illustrating a communication network according to embodiments.

Reference is again made to the communications network 100 of FIG. 1. The signals as fed from the wireless device no is further fed over a backhaul communication link 140 to a core network 150, and further from the core network 150 over communication link 160 to a service network (not illustrated) such as the Internet. The network node 200 can use one or more RRUs 120 to communicate with the wireless device 110 and assemble data received from the wireless device 110, which is further communicated with the core network 150 over the backhaul communication link 140, carrying only the actual bits communicated with the wireless device no.

Today, CPRI is typically used for communication between RRU 120 and network node 200 and so far the CPRI transport is mainly implemented using optical fiber. However, wireless CPRI transport may offer potentially lower cost and quicker deployment. Currently, CPRI adds extensive excess bandwidth compared to the transmitted radio channel bandwidth, which makes it cumbersome to use CPRI for transmission over a bandlimited wireless channel, such as a microwave link. Another is the time varying nature of a wireless radio channel due to environmental effect such as rain and layering that can lead temporary increase in attenuation and multi-path fading.

Since CPRI requires constant data rate, the use of adaptive modulation is not possible. Recently, there have been suggestions to keep the radio access technology (RAT) modulation format over the wireless fronthaul wireless radio link 130. Examples of such signals are long term evolution (LTE) or wide band code division multiple access (WCDMA). Here the RAT signals are simply up converted to an appropriate microwave frequency and possibly corrected for impairments such as phase noise and frequency drift. See Chen et al: "Demonstration of Analog Millimeter-wave Fronthaul Link for 64-QAM LTE Signal Transmission", VTC fall 2015. This yields improved spectral efficiency since only the actual bandwidth of the RAT signal plus some additional management data and synchronization signals are needed over the fronthaul link. Adaptivity to changes in the fronthaul wireless radio link 130 is maintained by the RAT system. In case of, for example, rain over the fronthaul wireless radio link 130, the signal-to-noise-ratio (SNR) of the RAT signal will be lower and for very low SNR, the RAT system will eventually lower the capacity for affected wireless devices no. In the same way; if selective fading occurs, The RAT system will adjust the useful bandwidth accordingly. However, this concept requires an additional management link since the full CPRI information is not maintained.

U.S. Pat. No. 9,020,070B2 discloses a system that separates management and RAT payload and the latter is transmitted as an analog signal over the fronthaul wireless radio link 130 while the management traffic is transmitted as digital symbols. However, one issue with the fronthaul concepts outlined above is the very limited possibility to adjust capacity of the fronthaul wireless radio link 130 during certain channel conditions, such as fading conditions. If the management data link is lost e.g. due to deep fading, all communication with the network node 200 is lost and will generate severe alarms in the management system of the core network 150.

Hence, there is still a need for an improved wireless radio transmission between a network node and a device receiving data from the network node.

The embodiments disclosed herein therefore relate to robust wireless radio transmission. In order to obtain robust wireless radio transmission there is provided a network node 200, a method performed by the network node 200, a computer program comprising code, for example in the form of a computer program product, that when run on a network node 200, causes the network node 200 to perform the method.

Figure 2A:
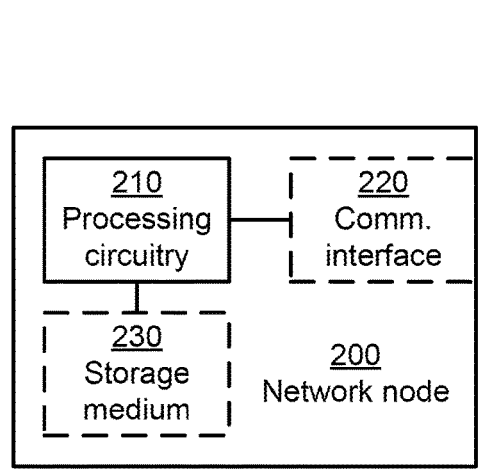
FIG. 2a is a schematic diagram showing functional units of a network node according to an embodiment.

FIG. 2a schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 310 (as in FIG. 3), e.g. in the form of a storage medium 230.

Particularly, the processing circuitry 210 is configured to cause the network node 200 to perform a set of operations, or steps, S102-S112. These operations, or steps, S102-S112 will be disclosed below. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 for communications with at least one RRU 120 over a wireless radio link 130 and a core network 150 over a communications link 140. As such the communications interface 220 may comprise one or more transmitters and receivers, comprising analogue and digital components and a suitable number of antennas for wireless communications and ports for wireline communications. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 2B:
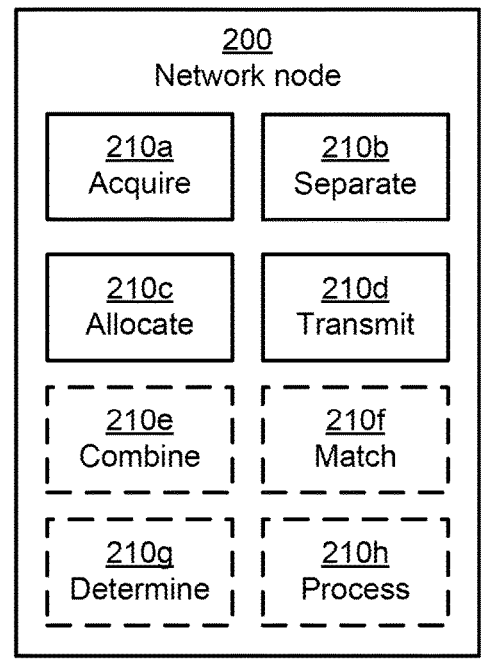
FIG. 2b is a schematic diagram showing functional modules of a network node according to an embodiment.

FIG. 2b schematically illustrates, in terms of a number of functional modules, the components of a network node 200 according to an embodiment. The network node 200 of FIG. 2b comprises a number of functional modules; an acquire module 210a configured to perform below steps S102, S106, a separate module 210b configured to perform below step S104, an allocate module 210c configured to perform below steps S108, S108a, S108b, and a transmit module 210d configured to perform step S112. The network node 200 of FIG. 2b may further comprises a number of optional functional modules, such as any of a combine module 210e configured to perform below step S110, a match module 210f configured to perform below step S108c, a determine module 210g configured to perform below steps S108d, S108e, and a process module 210h configured to perform below step S108f. The functionality of each functional module 210a-210h will be further disclosed below in the context of which the functional modules 210a-210h may be used. In general terms, each functional module 210a-210h may in one embodiment be implemented only in hardware or and in another embodiment with the help of software, i.e., the latter embodiment having computer program instructions stored on the storage medium 230 which when run on the processing circuitry makes the network node 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with functional units 220 and/or 230. The processing circuitry 210 may thus be configured to from the storage medium 230 fetch instructions as provided by a functional module 210a-210h and to execute these instructions, thereby performing any steps as will be disclosed hereinafter.

The network node 200 may be provided as a standalone device or as a part of at least one further device. For example, the network node 200 may be provided in a node of a radio access network. Alternatively, functionality of the network node 200 may be distributed between at least two devices, or nodes. These at least two nodes, or devices, may either be part of the same network part (such as the radio access network) or may be spread between at least two such network parts. In general terms, instructions that are required to be performed in real time may be performed in a device, or node, operatively closer to the RRU 120 than instructions that are not required to be performed in real time. In this respect, at least part of the network node 200 may reside in the radio access network, such as in a radio access network node.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210h of FIG. 2b and the computer program 320 of FIG. 3 (see below).

Figure 3:
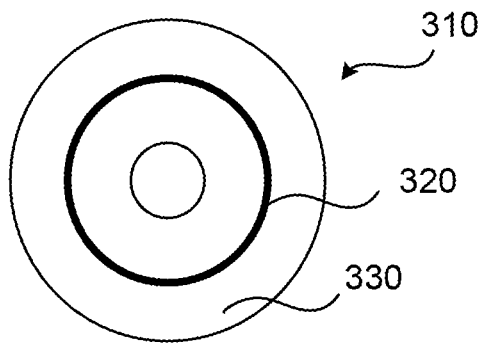
FIG. 3 shows one example of a computer program product comprising computer readable means according to an embodiment.

FIG. 3 shows one example of a computer program product 310 comprising computer readable means 330. On this computer readable means 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
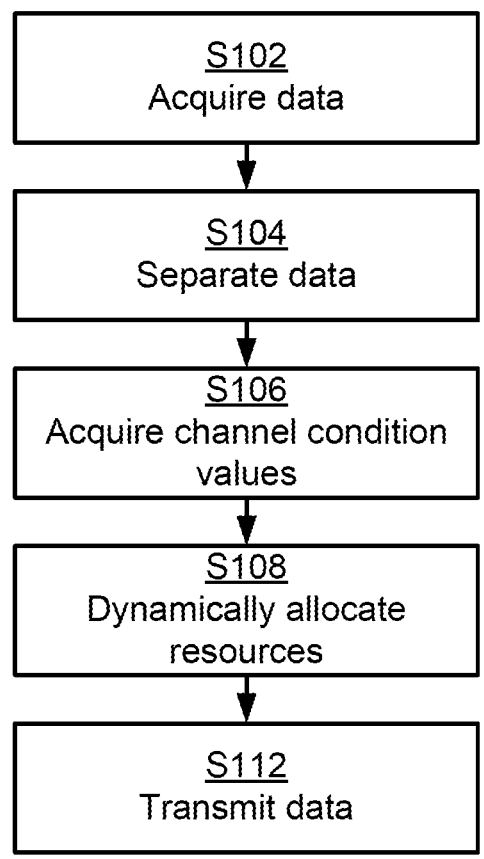
FIGS. 4 and 5 are flowcharts of methods according to embodiments.
Figure 5:
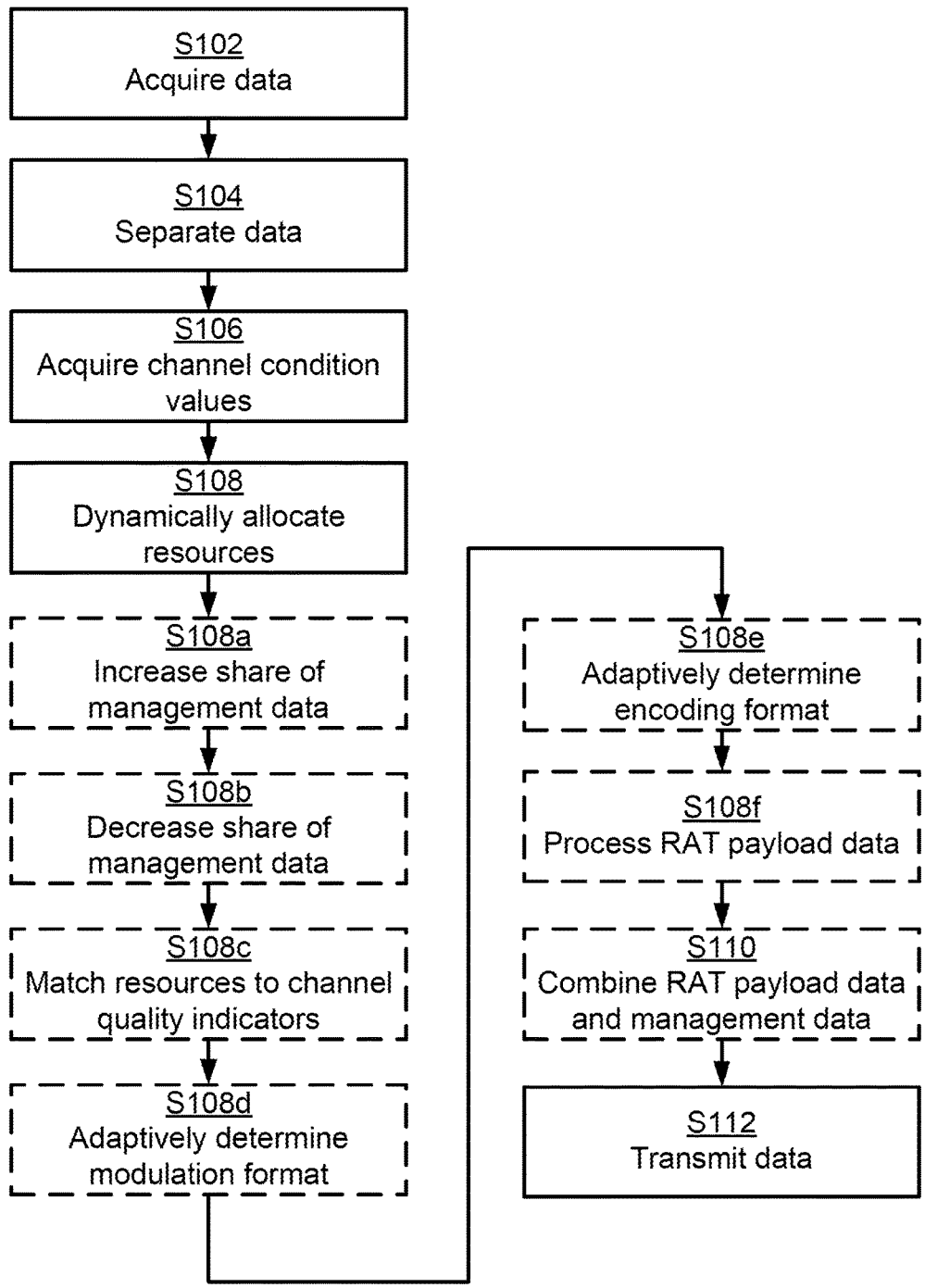

FIGS. 4 and 5 are flow charts illustrating embodiments of methods for robust wireless radio transmission. The methods are performed by the network node 200. The methods are advantageously provided as computer programs 320.

Reference is now made to FIG. 4 illustrating a method for robust wireless radio transmission as performed by the network node 200 according to an embodiment. Parallel references are made to FIGS. 1, 2a, and 2b.

The network node 200 is configured to, in a step S102, acquire data to be transmitted on a wireless radio link 130. In this respect the acquire module 210a may comprise instructions that when executed by the network node 200 causes the processing circuitry 210, possibly in conjunction with the communications interface 220 and the storage medium 230, to acquire this data in order for the network node 200 to perform step S104.

It is assumed that the data comprises radio access technology (RAT) payload and management data. Formats, such as CPRI, are more suitable for communications over an optical fiber having fixed bit-rate and a large constant capacity than for communication using a narrow bandwidth wireless channel with time varying fading. The RAT payload and the management data may be transmitted differently, for example using different relative shares of a fixed amount of resources. How to determine these relatives share will be further disclosed below. The network node 200 is therefore configured to, in a step S104, separate the data into a RAT payload part and a management data part. In this respect the separate module 210b may comprise instructions that when executed by the network node 200 causes the processing circuitry 210, possibly in conjunction with the communications interface 220 and the storage medium 230, to perform such a separation of the data in order for the network node 200 to perform step S104.

The network node 200 is further configured to, in a step S106, acquire channel condition values for the wireless radio link 130. In this respect the acquire module 210a may comprise instructions that when executed by the network node 200 causes the processing circuitry 210, possibly in conjunction with the communications interface 220 and the storage medium 230, to acquire the channel conditions in order for the network node 200 to perform step S106.

The channel condition values are used for allocating resources to the RAT payload part and the management data part. Particularly, the network node 200 is configured to, in a step S108, dynamically allocate resources between the RAT payload part and the management data part according to the channel condition values. In this respect the allocate module 210c may comprise instructions that when executed by the network node 200 causes the processing circuitry 210, possibly in conjunction with the communications interface 220 and the storage medium 230, to allocate the resources in order for the network node 200 to perform step S108. Some particular examples of how to perform the dynamic resource allocation will be given, and further elaborated on, in the disclosure of steps S108a-S108f, as well as in connection to FIGS. 8 and 9 below.

The data as acquired in step S102 and separated into the RAT payload part and the management data part in step S104 may be transmitted once resources have been allocated. Thus, the network node 200 is configured to, in a step S112, transmit the data over the wireless radio link 130 using the allocated resources. In this respect the transmit module 210d may comprise instructions that when executed by the network node 200 causes the processing circuitry 210, possibly in conjunction with the communications interface 220 and the storage medium 230, to transmit the data using the allocated resources in order for the network node 200 to perform step S112.

Some particular examples of how to perform the transmission of the data over the wireless radio link 130 will be given, and further elaborated on, in connection to FIGS. 8 and 9 below.

Resources may thereby be allocated between the RAT payload part and the management data part such that the management data part can be transported over the wireless radio link 130 even during poor channel conditions. The poor channel conditions may have been caused by heavy rain or multi-path fading.

Embodiments relating to further details of robust wireless radio transmission will now be disclosed.

The data may be CPRI data. Hence, the data may be communicated using the CPRI data format adapted for data transmission over wireless radio links 130. The RAT payload part may comprises in-phase and quadrature (IQ) samples. The management data part may further comprise pilot tones. The pilot tones may be used to assist mitigation of phase and frequency errors introduced on the wireless radio link 130.

In general terms, the CPRI data format embeds a low frequency version of the antenna signal, for example in terms of a sampled baseband version of the antenna signal, to be transmitted and received from a wireless device no as samples of the analog entity. A CPRI data stream may comprise multiple antenna signals of different RAT formats such as LTE and WCDMA, and I and Q samples from each channel may be interleaved in the CPRI data frames.

The wireless radio link 130 may be a fronthaul link of the network node 200.

There may be different ways to perform the resource allocation discussed above in connection to FIG. 4 and FIG. 5. A general requirement on the wireless radio link 130 is that the connectivity to the RRUs 120 connected by the wireless radio link 130 should never be broken. The connectivity refers to the management data part. This means that transmission of at least the management data part should always be possible over the wireless radio link 130 while the bandwidth of the RAT payload part carrying the radio signals can be reduced in order to lower the bandwidth of the total data over the wireless radio link 130. The resource allocation may thus be performed so as to prioritize transmission of the management data part over the RAT payload part. Further, the resource allocation may be performed such that the management data part is guaranteed transport over the wireless radio link 130.

The resources may be associated with allocation of frequency bandwidth and/or with allocation of time slots.

Reference is now made to FIG. 5 illustrating methods for robust wireless radio transmission as performed by the network node 200 according to further embodiments. Parallel references are continued to FIGS. 1, 2a, and 2b.

There may be different ways to perform the adaptive resource allocation as in step S108. Different embodiments relating thereto will now be disclosed in turn.

According to an embodiment the network node 200 is configured to, in a step S108a, allocate resources between the RAT payload part and the management data part so as to increase the first relative share in the common radio frame as said channel condition values worsens. Since the radio frame size is fixed, increasing the first relative share causes the second relative share to decrease. As an illustrative example, suppose that an adaptive modulation mechanism in the network node 200 detects that a change in modulation from M-QAM to (M−1)-QAM is required for transmission of the management data part due to worsened channel conditions. The effective number of bits per symbol then decreases from N to N−1, which means that the bandwidth necessary to transport a fixed number of bits per symbol for the management data part increases. Consequently, in a wireless radio link 130 having a fixed bandwidth, the bandwidth left for the RAT payload part needs to be decreased as much as the bandwidth for the management data part is increased.

According to an embodiment the network node 200 is configured to, in a step S108b, allocate resources between the RAT payload part and the management data part so as to decrease the first relative share in the common radio frame as the channel condition values improves. Since the frame size is fixed, decreasing the first relative share causes the second relative share to increase.

There may be different ways to provide the channel condition values. For example, the channel condition values may be provided as channel quality indicators of the wireless radio link 130. The channel quality indicators may be provided as signal to noise ratio values, received power values, quality of service values, etc. The resources may then be dynamically allocated between the RAT payload part and the management data part as follows. The network node 200 may be configured to, in a step S108c, match values of the resources to values of the channel quality indicators.

There may be different ways for the network node 200 to perform dynamic resource allocation for the management data part, as in step S108. For example, the management data part may be modulated and/or encoded according to a modulation and/or coding format having a spectral efficiency value. The resources may then be dynamically allocated between the RAT payload part and the management data as follows. The network node 200 may be configured to, in a step S108d, adaptively determine which modulation and/or coding format from at least two modulation and/or coding formats with different spectral efficiency values to use according to the channel condition values. Each one of the at least two modulation and/or coding formats may be associated with a respective range of values of the channel condition values. Further, each one of the at least two modulation and/or coding formats may be associated with a respective value of the resources. Hence, the resource allocation may be performed adaptively using adaptive modulation and/or coding for transmission on a fixed bit-rate control channel. The resource allocation for the management data part then follows from the determined modulation and/or coding format.

There may be different ways for the network node 200 to perform dynamic resource allocation for the RAT payload part, as in step S108 For example, reducing the bandwidth of the RAT payload part can by the network node 200 be performed in several ways, utilizing the adaptive properties of the RAT system. For example, the RAT payload part may be uncoded. The resources may then be dynamically allocated between the RAT payload part and the management data as follows. The network node 200 may be configured to, in a step S108f, process the RAT payload part in time and/or frequency depending on the channel condition values. The processing may involve resampling, filtering, multiplexing the RAT payload part in time and/or frequency, or any combination thereof. The processing is performed so as to reduce the amount of the RAT payload part of the data. Hence, the resampling, filtering, multiplexing generally result in lossy compression of the RAT payload part. Parameter values of the resampling, filtering, and multiplexing may be associated with values of the resources. Hence, IQ samples may be resampled and reduced in bandwidth so as to reduce the resources needed for transmission of the RAT payload part depending on the available bandwidth and SNR in the wireless radio link 130.

Figure 6:
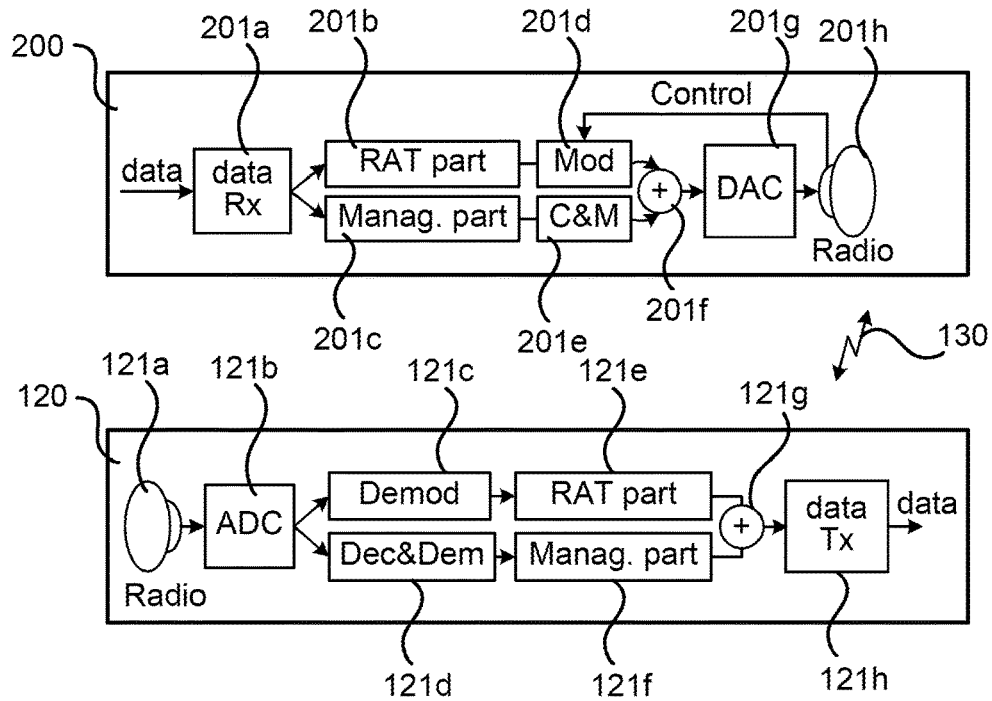
FIGS. 6 and 7 schematically illustrate a network node and a remote radio unit according to embodiments.

FIG. 6 schematically illustrates a network node 200 and a remote radio unit 120 communicating over a wireless radio link 130 according to an embodiment. The network node 200 receives data at a data receiver (Rx) 201a. The received data is split into a RAT payload part 201b and a management data part 201c. The RAT payload part is modulated by a modulator told and the management data part is encoded and modulated by an encoder and modulator 201e. The modulator 201d may perform modulation according a control signal, where the control signal is based on acquired channel condition values for the wireless radio link 130. Resources between the RAT payload part and the management data part may thereby be dynamically allocated according to the channel condition values. The thus modulated RAT payload part and encoded and modulated management data part are then combined by a combiner 201f. The thus combined RAT payload part and management data part is then converted by a digital to analogue converter (DAC) 201g. The thus analogue combined RAT payload part and management data part is then transmitted by a radio 201h. Essentially, the remote radio unit 120 performs the inverse operations of the network node 200 in reversed order. Hence, the remote radio unit 120 comprises a radio 121a for receiving the data having been transmitted by the network node 200. The received data is converted by an analog to digital converter (ADC) 121b and split so as to separately process the RAT payload part and the modulated management data part of the received data. The RAT payload part is demodulated by a demodulator 121C and the management data part is decoded and demodulated by a decoder and demodulator 121d to form a demodulated RAT payload part 121e and a decoded and demodulated management data part 121f. The demodulated RAT payload part 121e and the decoded and demodulated management data part 121f are combined by a combiner 121g to form data to be transmitted by a transmitter (Tx) 121h. FIG. 6 has illustrated a scenario where data is transmitted from the network node 200 to the remote radio unit 120. However, as the skilled person understands, data can likewise be transmitted from the remote radio unit 120 to the network node 200 and hence the operations of the network node 200 and the remote radio unit 120 may be interchanged. In general terms, the network node 200 and the remote radio unit 120 may be configured for both transmission of data and reception of data over the wireless radio link 130. The functionality performed by the modules 201a-201h may be realized by the modules 210a-210h.

In the system outlined in FIG. 6 comprising a network node 200 and an RRU 120 the RAT payload part is maintained "as is" while the management data part is mapped onto symbols, such as 1024-QAM, 512-QAM depending on available SNR, or down to Quadrature Phase Shift Keying (PSK) or even Binary Phase Shift Keying (BPSK) during poor conditions with very low SNR. However, since the bit-rate of the management data part is constant from the perspective of the data frames, the required bandwidth increases when using a lower modulation format. When the bandwidth of the management data part expands, the bandwidth of the RAT payload part must be truncated in order to fit both the management data part and the RAT payload part into the allowed frequency spectrum.

Figure 8:
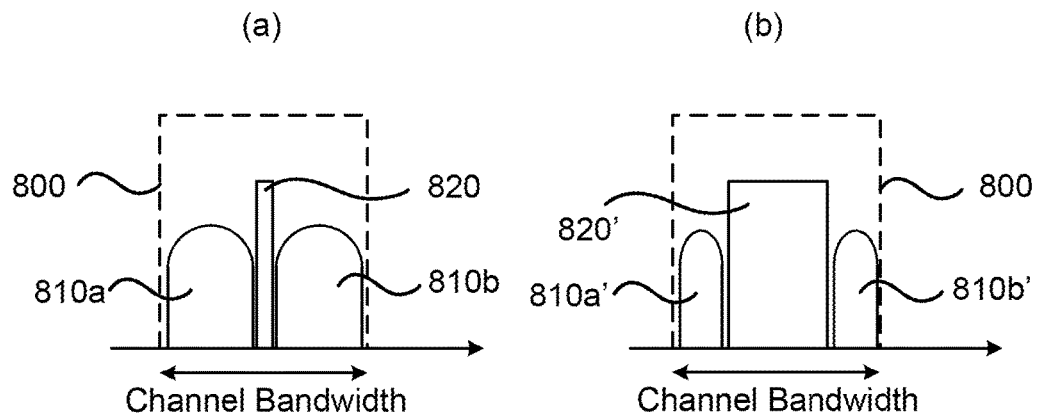
FIG. 8 schematically illustrates bandwidth allocation according to an embodiment.

FIG. 8 exemplifies multiplexing of RAT payload part and a management data part in the frequency domain inside a fixed bandwidth 800 with two different channels 810a, 810b for the RAT payload part and one channel 820 for the management data part. FIG. 8(a) exemplifies the bandwidth partitioning during normal channel conditions inside where only a few percent of the total fronthaul bandwidth is used for management data.

In order to accommodate more bandwidth to the management data part during poor SNR, the available bandwidth allocated to the RAT payload part is shrunk by filtering the RAT payload part using, for example band-pass filtering to truncate the RAT payload part, as in step S108f. FIG. 8(b) shows an example of the fronthaul bandwidth partitioning during poor channel conditions inside the fixed bandwidth 800 with two different channels 810a', 810b' for the RAT payload part and one channel 820' for the management data part, where the channel 820' occupies a larger bandwidth portion than channel 820 and where channels 810a' and 810b', consequently, occupy smaller bandwidth portions than channels 810a and 810b, respectively.

Typically RAT system uses orthogonal frequency division multiplexing (OFDM) where capacity is lowered by omitting some sub-carriers. The capacity of the radio access channel used for transmission of the RAT payload data part will thereby become lower but the connectivity for the transmission of the RAT payload data part is maintained by the RAT scheduling system. In addition to the intentionally introduced bandwidth reduction, the RAT payload may also suffer SNR degradation due to the amplitude fading of the wireless radio link 130.

Figure 9:
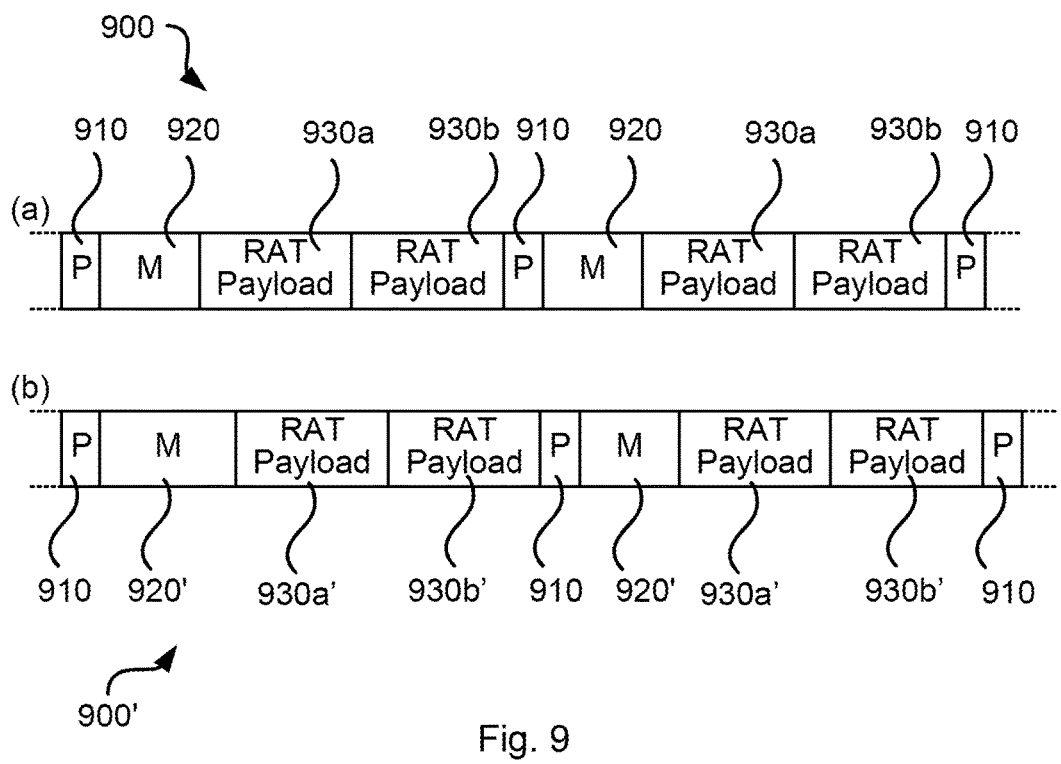
FIG. 9 schematically illustrates radio frames according to an embodiment.

FIG. 9 exemplifies how symbols of the RAT payload part and symbols of the management data part can be time multiplexed in (a sequence of) radio frames 900, 900'. When multiplexing in the time domain, the management data part is mapped onto symbols with a suitable modulation format for a given link condition, such as maximizing capacity for a given SNR. The RAT payload part is then resampled to fit the remaining space in the radio frame. During normal conditions the time partitioning between pilot symbols 910, the management data part 920 and the RAT payload part 930a, 930b is exemplified in FIG. 9(a), while FIG. 9(b) exemplifies the time partitioning between pilot symbols 910, the management data part 920' and the RAT payload part 930a', 930b' during fading condition. In FIG. 9(b) the management data part is modulated onto the radio frequency carrier using lower modulation formats and thus requires a larger fraction of the radio time frame and thus the amount of samples in the RAT payload part must be decreased.

One option to lower the amount of data in the RAT payload part is to reduce the sampling resolution, as in step S108f, from native 32 bits per sample (e.g., 16 its per I and Q sample if the RAT payload part comprises IQ samples) to a lower resolution according to the available bandwidth. As an example, resampling to, for example, 16 bits will reduce the payload to 50% of the original data rate. In FIG. 9(b), only the management data part is extended but possibly also the amount of pilot symbols may be increased during times with poor SNR in the wireless radio link 130.

Figure 7:
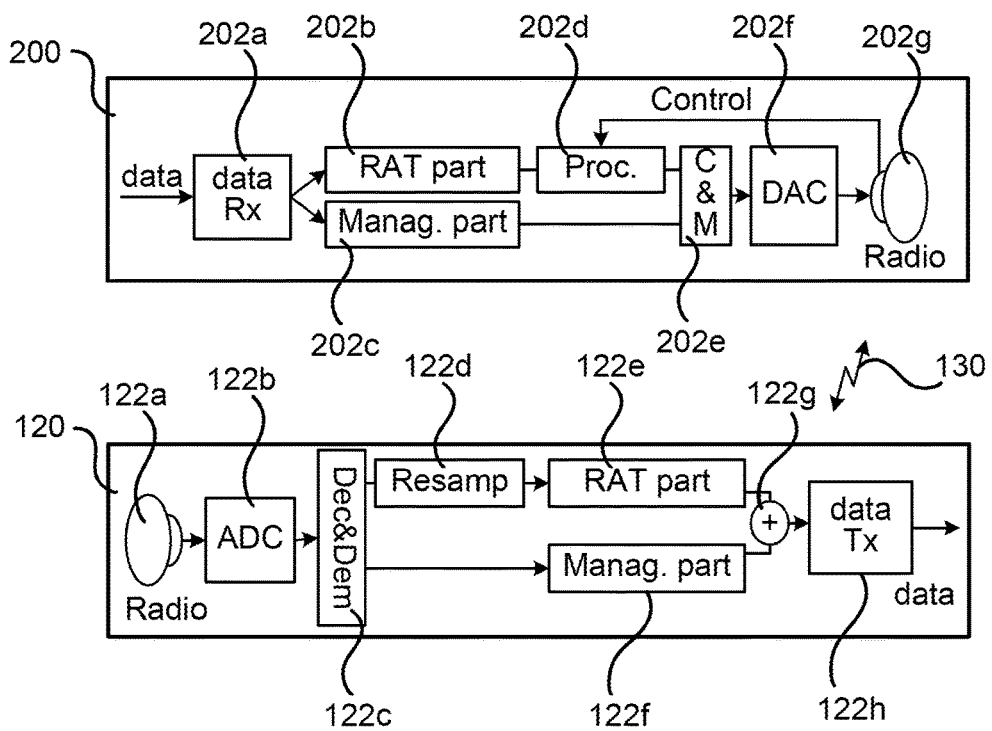

Another option for dynamically allocating resources between the RAT payload part and the management data part is illustrated in the schematic diagram of FIG. 7. Here both the management data part and the RAT payload part are encoded and mapped on a suitable modulation format, but the RAT payload part is reduced according to the current capacity of the wireless radio link 130.

FIG. 7 schematically illustrates a network node 200 and a remote radio unit 120 communicating over a wireless radio link 130 according to an embodiment. The network node 200 receives data at a data receiver (Rx) 202a. The received data is split into a RAT payload part 202b and a management data part 202C. The RAT payload part is processed by a processor 202d. The processor 202d may perform processing according a control signal, where the control signal is based on acquired channel condition values for the wireless radio link 130. Resources between the RAT payload part and the management data part may thereby be dynamically allocated according to the channel condition values. The thus processed RAT payload part and the management data part is encoded and modulated by an encoder and modulator 202e. The thus encoded and modulated RAT payload part and the encoded and modulated management data part are then converted by a digital to analogue converter (DAC) 202f. The thus analogue RAT payload part and management data part is then transmitted by a radio 202h. Essentially, the remote radio unit 120 performs the inverse operations of the network node 200 in reversed order. Hence, the remote radio unit 120 comprises a radio 122a for receiving the data having been transmitted by the network node 200. The received data is converted by an analog to digital converter (ADC) 122b. The thus digital received data is decoded and demodulated by a decoder and demodulator 122C to form a decoded and demodulated RAT payload part and a decoded and demodulated management data part 122f. The decoded demodulated RAT payload part is resampled by a re-sampler 122d to form a RAT payload part 122e. The RAT payload part 122e and the management data part 122f are combined by a combiner 122g to form data to be transmitted by a transmitter (Tx) 122h. FIG. 7 has illustrated a scenario where data is transmitted from the network node 200 to the remote radio unit 120. However, as the skilled person understands, data can likewise be transmitted from the remote radio unit 120 to the network node 200 and hence the operations of the network node 200 and the remote radio unit 120 may be interchanged. In general terms, the network node 200 and the remote radio unit 120 may be configured for both transmission of data and reception of data over the wireless radio link 130. The functionality performed by the modules 202a-202g may be realized by the modules 210a-210h.

As mentioned above, the number of samples in the RAT payload part can be decreased by reducing the bandwidth and/or the resolution (i.e. the number of bits used for representing the complex number I+jQ)). One advantage with the digital concept illustrated in FIG. 7 comprising a network node 200 and an RRU 120 compared to the "analog" concept illustrated in FIG. 6 is that the spectrum shape is completely controlled by the fronthaul radio rather than the RAT system, which may simplify spectrum mask conformance of the wireless radio link 130.

In general terms, any of the above disclosed embodiments for dynamic resource allocation may be implemented by the network node 200 maintaining a mapping between ranges of channel condition values and pre-determined resource allocations. The mapping may be stored in the storage medium 230.

There may be different ways to transmit the data over the wireless radio link 130. For example, the network node 200 may be configured to, in a step S110, combine the RAT payload part and the management data part into a common radio frame prior to transmitting the data over the wireless radio link 130. Hence, the RAT payload part and the management data part may, in a step S112, be transmitted in a common radio frame. The common radio frame may have a size which is independent from said the condition values. The common radio frame comprises a first relative share of the management data part and a second relative share of the RAT payload part. The size relation between the first relative share and the second relative share depends on the channel condition values. How this size relation may be determined so as to dynamically allocate resources between the RAT payload part and the management data part have been disclosed above.

In summary, according to at least some of the herein disclosed embodiments there have been provided mechanisms for robust wireless radio transmission where data, such as CPRI data, is separated into two parts and where the SNR and bandwidth of the RAT payload part is reduced. The management data part may be coded and modulated with a suitable proprietary coding and modulation technique for the wireless channel while the RAT payload part is kept uncoded and only resampled and/or multiplexed in time or frequency. Subsequently, the management data part and the RAT payload part may be multiplexed into a common radio frame before digital-to-analog conversion (DAC) and up-conversion to a microwave carrier frequency. In the receiver, the antenna signal is down-converted a digitized in an analog-to-digital converter (ADC) where after the management data part and the RT payload part are separated into separate signal paths. The management data part is decoded using the proprietary technology while the RAT payload part is only demodulated and resample to fit the resolution. Adaptivity can now be achieved by sacrificing SNR and bandwidth of the RAT payload part. During e.g. rain, the RAT payload part will suffer from SNR degradation, which is handled by the RAT system, and more bandwidth can hence be dynamically increased to the management data part as the bandwidth of the RAT payload part is truncated. Truncation of the available bandwidth for the RAT payload part naturally reduces the capacity of the RAT payload part but ensures that the link for management data never goes down during rain or atmospheric disturbances.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for robust wireless radio transmission, the method being performed by a network node, the method comprising:
   acquiring data to be transmitted on a wireless radio link from the network node to a remote radio unit, the wireless radio link having a first bandwidth;
   separating said data into a radio access technology, RAT, payload part and a management data part;
   acquiring channel condition values for said wireless radio link;
   dynamically allocating resources between said RAT payload part and said management data part to fit within the first bandwidth according to said channel condition values;
   wherein the resource allocation is performed so as to prioritize transmission of the management data part over the RAT payload part and wherein the resource allocation is performed such that the management data part is guaranteed transport over the wireless radio link; and
   transmitting said data over said wireless radio link using said allocated resources.

2. The method according to claim 1, wherein said data is common public radio interface, CPRI, data.

3. The method according to claim 1, further comprising:
   combining said RAT payload part and said management data part into a common radio frame prior to transmitting said data over said wireless radio link.

4. The method according to claim 3, wherein said common radio frame has a size which is independent from said channel condition values, wherein said common radio frame comprises a first relative share of said management data part and a second relative share of said RAT payload part, and wherein a size relation between said first relative share and said second relative share depends on said channel condition values.

5. The method according to claim 4, wherein dynamically allocating resources between said RAT payload part and said management data part involves:
   allocating resources between said RAT payload and said management data part so as to increase said first relative share in said common radio frame as said channel condition values worsens.

6. The method according to claim 4, wherein dynamically allocating resources between said RAT payload part and said management data part involves:
   allocating resources between said RAT payload part and said management data part so as to decrease said first relative share in said common radio frame as said channel condition values improves.

7. The method according to claim 1, wherein said channel condition values are provided as channel quality indicators, and wherein dynamically allocating resources between said RAT payload part and said management data part involves:
   matching values of said resources to values of said channel quality indicators.

8. The method according to claim 7, wherein each one of said at least two modulation and/or coding formats is associated with a respective value of said resources.

9. The method according to claim 7, wherein parameter values of said resampling, filtering, and multiplexing are associated with values of said resources.

10. The method according to claim 1, wherein said management data part is modulated and/or encoded according to a modulation and/or coding format having a spectral efficiency value, and wherein dynamically allocating resources between said RAT payload part and said management data part involves:
    adaptively determining, according to said channel condition values, which modulation and/or coding format from at least two modulation and/or coding formats with different spectral efficiency values to use.

11. The method according to claim 10, wherein each one of said at least two modulation and/or coding formats is associated with a respective range of values of said channel condition values.

12. The method according to claim 1, wherein said RAT payload part is uncoded, and wherein dynamically allocating resources between said RAT payload part and said management data part involves:
    processing said RAT payload part in time and/or frequency depending on said channel condition values, wherein said processing involves at least one of resampling, filtering, and multiplexing said RAT payload part in time and/or frequency.

13. The method according to claim 1, wherein the resources are associated with allocation of frequency bandwidth.

14. The method according to claim 1, wherein the resources are associated with allocation of time slots.

15. The method according to claim 1, wherein the RAT payload part comprises in-phase and quadrature, IQ, samples.

16. The method according to claim 1, wherein said management data part further comprises pilot tones.

17. The method according to claim 1, wherein the wireless radio link is a fronthaul link of the network node.

18. A network node for robust wireless radio transmission, the network node comprising processing circuitry, the processing circuitry being configured to cause the network node to:
    acquire data to be transmitted on a wireless radio link from the network node to a remote radio unit, the wireless radio link having a first bandwidth;
    separate said data into a radio access technology, RAT, payload part and a management data part;

acquire channel condition values for said wireless radio link;

dynamically allocate resources between said RAT payload part and said management data part to fit within the first bandwidth according to said channel condition values;

wherein the resource allocation is performed so as to prioritize transmission of the management data part over the RAT payload part and wherein the resource allocation is performed such that the management data part is guaranteed transport over the wireless radio link; and transmit said data over said wireless radio link using said allocated resources.

19. The network node according to claim 18, further comprising a storage medium storing a set of operations for causing the network node to perform said method, and wherein the processing circuitry is configured to retrieve said set of operations from the storage medium to cause the network node to perform said set of operations.

20. The network node according to claim 18, wherein said set of operations is provided as a set of executable instructions.

21. A network node for robust wireless radio transmission, the network node comprising:

processing circuitry; and a computer readable storage medium storing instructions that, when executed by the processing circuitry, causes the network node to:

acquire data to be transmitted on a wireless radio link, the wireless radio link having a first bandwidth;

separate said data into a radio access technology, RAT, payload part and a management data part;

acquire channel condition values for said wireless radio link;

dynamically allocate resources between said RAT payload part and said management data part to fit within the first bandwidth according to said channel condition values;

wherein the resource allocation is performed so as to prioritize transmission of the management data part over the RAT payload part and wherein the resource allocation is performed such that the management data part is guaranteed transport over the wireless radio link; and transmit said data over said wireless radio link using said allocated resources.

* * * * *